United States Patent
Aspden

[15] 3,676,960
[45] July 18, 1972

[54] OPTICAL SURFACE GENERATING APPARATUS

[72] Inventor: Ronald Aspden, Bedford, Mass.
[73] Assignee: Itek Corporation, Lexington, Mass.
[22] Filed: May 25, 1970
[21] Appl. No.: 50,012

Related U.S. Application Data

[62] Division of Ser. No. 719,657, April 8, 1968, Pat. No. 3,587,195.

[52] U.S. Cl. .................................51/165.71, 51/54
[51] Int. Cl. ........................................B24b 49/02
[58] Field of Search..............51/165.71, 54, 56, 125, 284

[56] References Cited

UNITED STATES PATENTS

| 1,474,672 | 11/1923 | Heuze | 51/56 |
|---|---|---|---|
| 1,773,388 | 8/1930 | Canning | 51/54 |
| 1,917,504 | 7/1933 | Curtis | 51/56 |
| 2,118,912 | 5/1938 | Armitage | 51/125 X |
| 3,431,688 | 3/1969 | Rudd et al. | 51/284 |
| 3,471,976 | 10/1969 | Barnett | 51/284 |

FOREIGN PATENTS OR APPLICATIONS

| 244,100 | 7/1926 | Great Britain | 51/56 |
|---|---|---|---|

Primary Examiner—Lester M. Swingle
Attorney—Homer O. Blair, Robert L. Nathans, Lester S. Grodberg and John E. Toupal

[57] ABSTRACT

A method wherein an optical blank work surface is figuratively divided into an array of adjoining surface areas and measured to determine the total relative number of uniformly sized blank material decrements that are required in each surface area to produce a desired surface contour. An optical lap moving across the work surface in an irregular continuous path produces one of the uniform decrements upon each traversal across an individual surface area. The lap is controlled such that its travel path exhibits a preference for movement from an occupied area to adjacent areas still requiring the greatest number of material decrements.

7 Claims, 7 Drawing Figures

Inventor:
Ronald Aspden

PATENTED JUL 18 1972

Inventor:
Ronald Aspden,
By Gerald H. Glanzman
Attorney

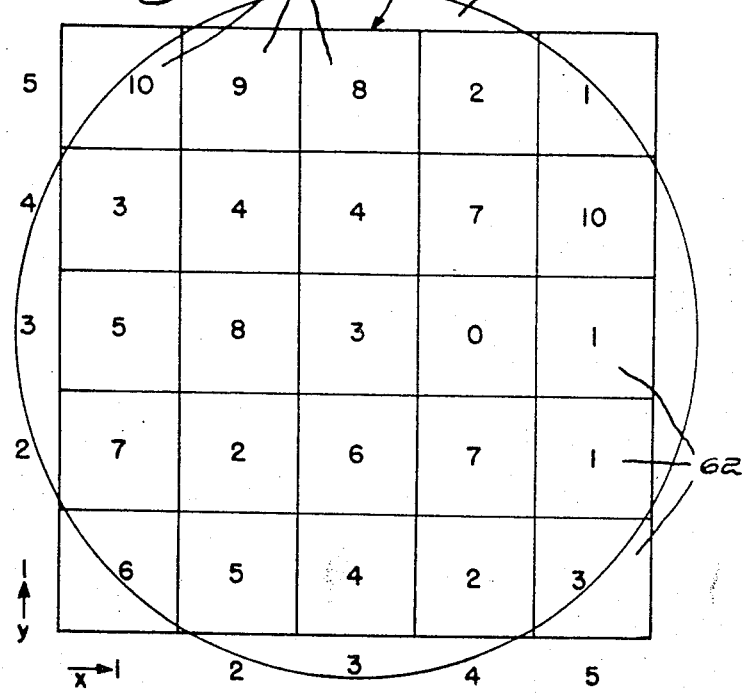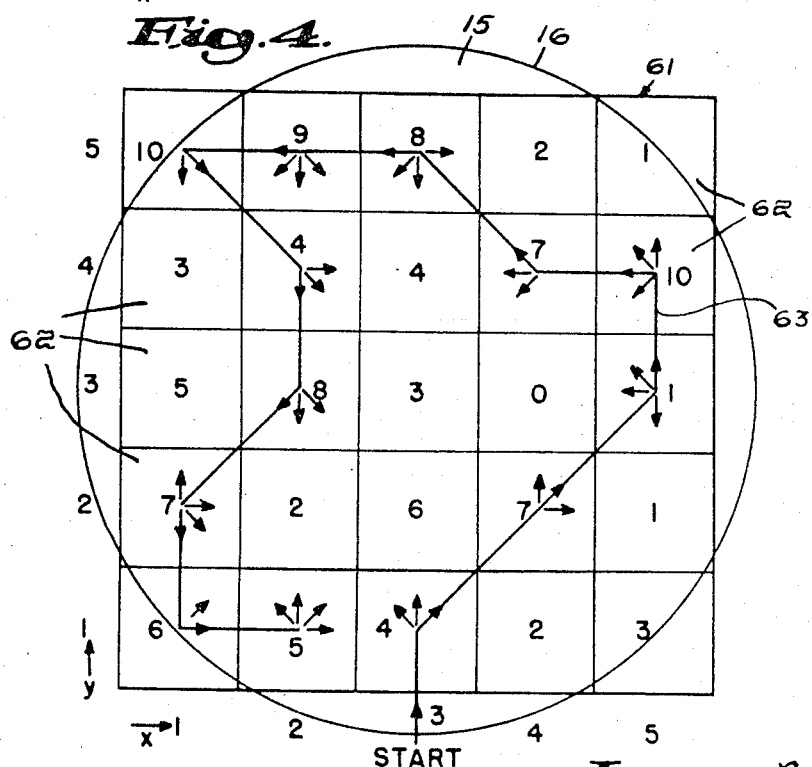

Inventor:
Ronald Aspden,
by Gerald H. Hanyman
Attorney

OPTICAL SURFACE GENERATING APPARATUS

This application is a division of my application Ser. No. 719,657, filed Apr. 8, 1968, now U.S. Pat. No. 3,587,195, dated June 28, 1971.

BACKGROUND OF THE INVENTION

This invention generally relates to an apparatus for producing desired surface contours. The invention especially relates to an apparatus for generating desired optical surfaces.

According to known methods, optical surfaces are ground and polished by utilizing completely empirically developed techniques. The practice of optical surface generation in accordance with these techniques suffers from a number of disadvantages including the requirement for highly skilled technicians, lengthy processing periods, limited effectiveness when either operating or generating rotationally asymmetrical surfaces, etc. These deficiencies are accentuated in the production of relatively large surfaces of, for example, 15-inch diameter and larger since during the polishing process large surfaces frequently develop rotational asymmetries and random irregularities that are not experienced with small surface work. In addition, the presently applied methods of large optical surface generation use the generally inappropriate empirical techniques developed during the working of small surfaces. Thus, a general need exists for improved optical surface generation systems and especially to generation systems for large surfaces.

The object of this invention, therefore, is to provide a simplified optical surface generating technique that reduces required finishing time and is applicable to both large and irregular surfaces.

A primary feature of this invention is the provision of a method for generating a desired surface contour on a workpiece blank having a work surface with an initial contour error with respect to the desired surface and including the steps of figuratively dividing the initial work surface into an array of adjoining surface areas, determining the total relative number of blank material decrements of a substantially uniform predetermined size that must occur in each of the surface areas to produce the desired surface contour, moving an optical lap across the work surface in an irregular, continuous path through the individual surface areas such that each movement of the lap across one of the surface areas produces a material decrement of the predetermined size, and controlling the lap movement such that the lap at least generally progresses from one surface area to that directly adjacent surface area still requiring the greatest relative number of blank material decrements. This systematic method of lap control reduces the existing surface contour error in an extremely efficient manner and its effectiveness is insensitive to surface irregularities either in the initial workpiece surface or in the desired finished surface.

Another feature of this invention is the provision of an apparatus of the above featured type wherein the lap is always moved from a presently occupied surface area into the adjacent surface area still requiring the greatest number of blank material decrements but which was not occupied by the lap immediately before its movement into its present position. Control of the lap in this fashion prevents direct lap movement reversals that tend to reduce the optical quality of the generated surface.

Another feature of this invention is the provision of an apparatus of the above featured types wherein the lap is occasionally moved into an adjacent surface area other than that still requiring the greatest number of material decrements as described above. By purposely altering on certain occasions the systematic movement of the lap into surface areas still exhibiting the greatest relative contour error, one eliminates the possibility of working exclusively for extended periods in areas of high contour error while ignoring areas possessing relatively small contour error. In this way, the possibility is reduced that significant and undesirable changes in lap characteristics will occur.

Another feature of this invention is the provision of an apparatus of the above featured types wherein the lap is moved only to adjacent surface areas requiring a change in the direction of lap movement of less than 90°. The absence of sharp changes in the direction of lap movement produces an optical surface of improved quality.

Another feature of this invention is the provision of an optical surface generating system including a support for an optical blank, a carriage supporting an optical lap and adapted to guide movement thereof along the surface of the optical blank, a drive mechanism for producing independently controlled movement of the lap in two dimensions, and a drive control adapted for selective operation to produce movement of the lap to a predetermined position with respect to the surface of the optical blank. This system is specifically suited for practicing the optical surface generating methods described above.

Another more general feature of the invention is the provision of an apparatus for producing a desired surface contour on a given workpiece. According to the apparatus, an initial surface on the workpiece is figuratively divided into an array of discrete adjoining surface areas and a determination is made as to the total surface change required in each of the surface areas to produce the desired surface contour. A plurality of operations are performed on each of the surface areas with each such operation effecting a substantially uniform change in the relative elevation of the surface area operated upon with respect to the other surface areas. This surface change can entail either a material decrement or an incremental build-up of material in the area operated upon. By performing the operations in an orderly sequence wherein successive operations occur on adjacent surface areas and varying the total number of operations performed on individual surface areas in accordance with the total surface change required, the initial workpiece surface is converted into the desired surface contour. This systematic approach to surface alteration produces an extremely regular surface and is applicable to various methods of surface generation including, for example, grinding, polishing, vapor deposition, spray painting, etc.

Another feature of the invention is the provision of an apparatus of the above featured type wherein new operations are generally performed on the adjacent surface area still requiring the greatest number of operations to produce the desired surface contour. In this way the error range between the existing and the desired surface is systematically reduced.

Another feature of this invention is the provision of an apparatus of the above featured type wherein the operations are performed in an orderly sequence such that a new operation is always performed on a surface area not operated upon during the two immediately preceding operations. This apparatus prevents direct reversals in the path of the sequential operations which reversals can introduce local non-uniformities in the surface produced.

These and other objects and features of the present invention will become more apparent upon a perusal of the following specification taken in conjunction with the accompanying drawings wherein.

Figure 6:
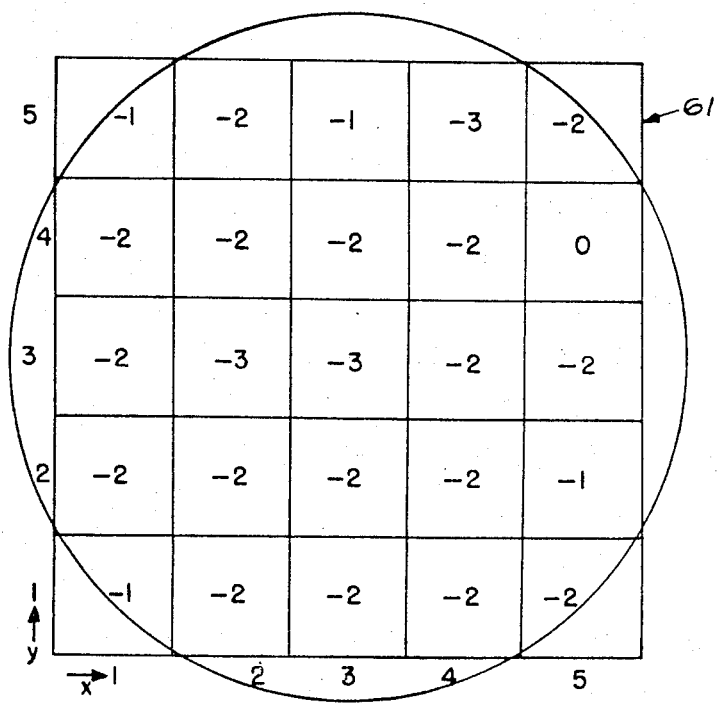
Figure 5:
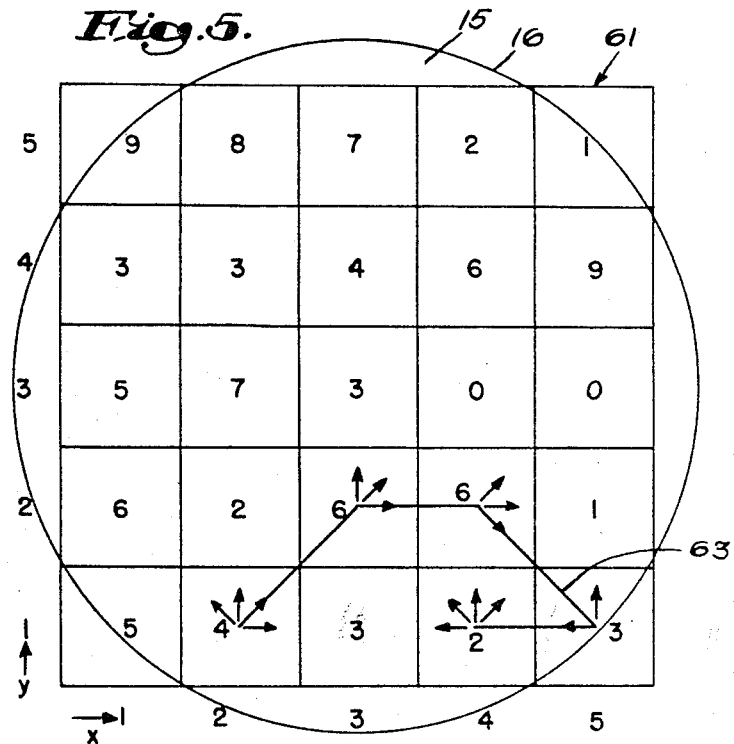
Figure 8:
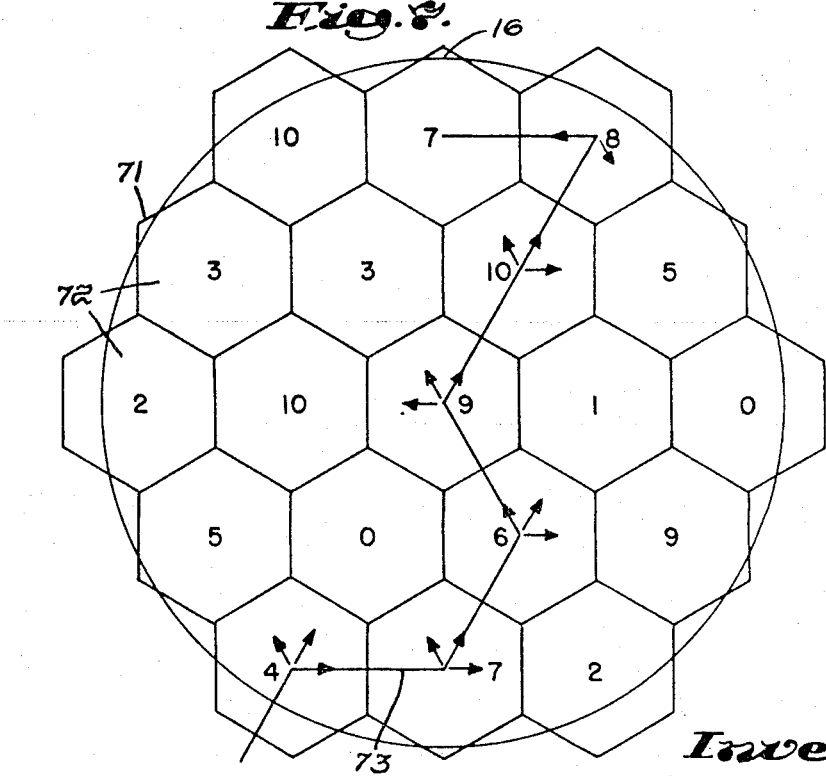

FIG. 3 schematically illustrates an optical blank figuratively divided into a preferred array of discrete surface areas each bearing a contour error designation;

FIG. 4 illustrates the movement of an optical lap through the array surfaces along a path determined by one embodiment of the invention;

FIG. 5 illustrates a continuation of the lap travel path shown in FIG. 4;

FIG. 6 illustrates the surface array of FIG. 3 with contour error designations after an extensive period of lap travel; and FIG. 7 illustrates another preferred surface array embodiment of the invention.

Figure 1:
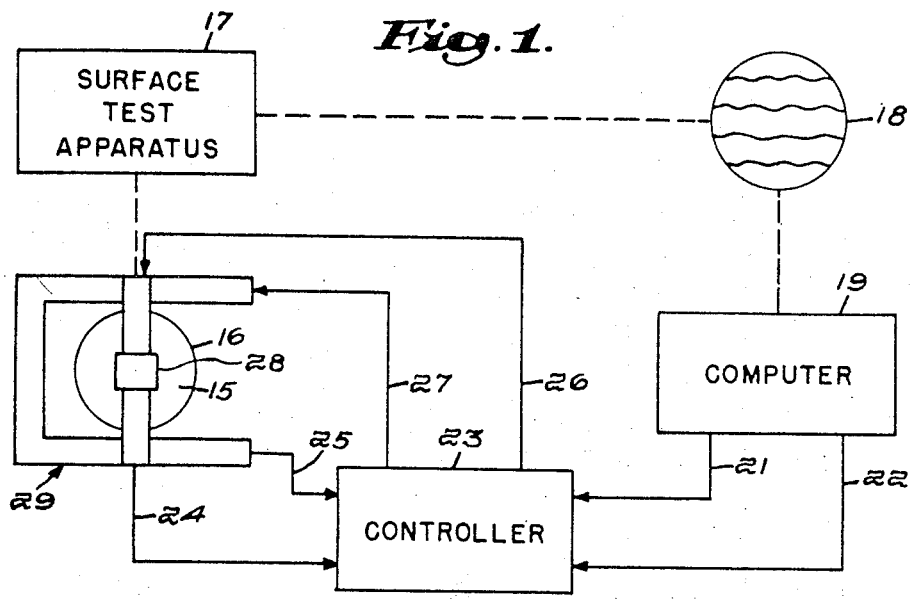
FIG. 1 is a diagram schematically illustrating the steps of a preferred optical surface generating apparatus of the invention.

Referring now to FIG. 1 there is shown a diagram illustrating functionally related elements used in a preferred embodiment of the invention. An initial surface 15 of the optical blank 16 is measured by suitable surface test apparatus 17. Measurement of the surface 15 can be made mechanically by, for example, dial indicators or a traversing probe. Preferably however, the measurement comprises an examination of the surface 15 by an interferometer which produces an interference picture 18 representing the surface characteristics of the blank 16.

Next, the information obtained by measurement of the surface 15 is compared with information relating to the optical surface desired and the relative contour errors; i.e. differences between existing and desired relative elevations, existing in various areas of the surface 15 is determined. This comparison preferably is made by the computer 19 which provides on lines 21 and 22 digital information that is fed into the controller 23. In response to the digital information on lines 21 and 22 and feedback signals on lines 24 and 25, the controller 23 produces on lines 26 and 27 output voltages that control movement of the lap 28 along the surface 15.

The lap 28 is supported on the table 29 which permits two-dimensional movement thereof along the surface 15 of the workpiece blank 16. As described below, the movement of the lap 28 is systematically controlled so as to reduce the existing contour error and thereby generate the desired surface on the blank 16.

Figure 2:
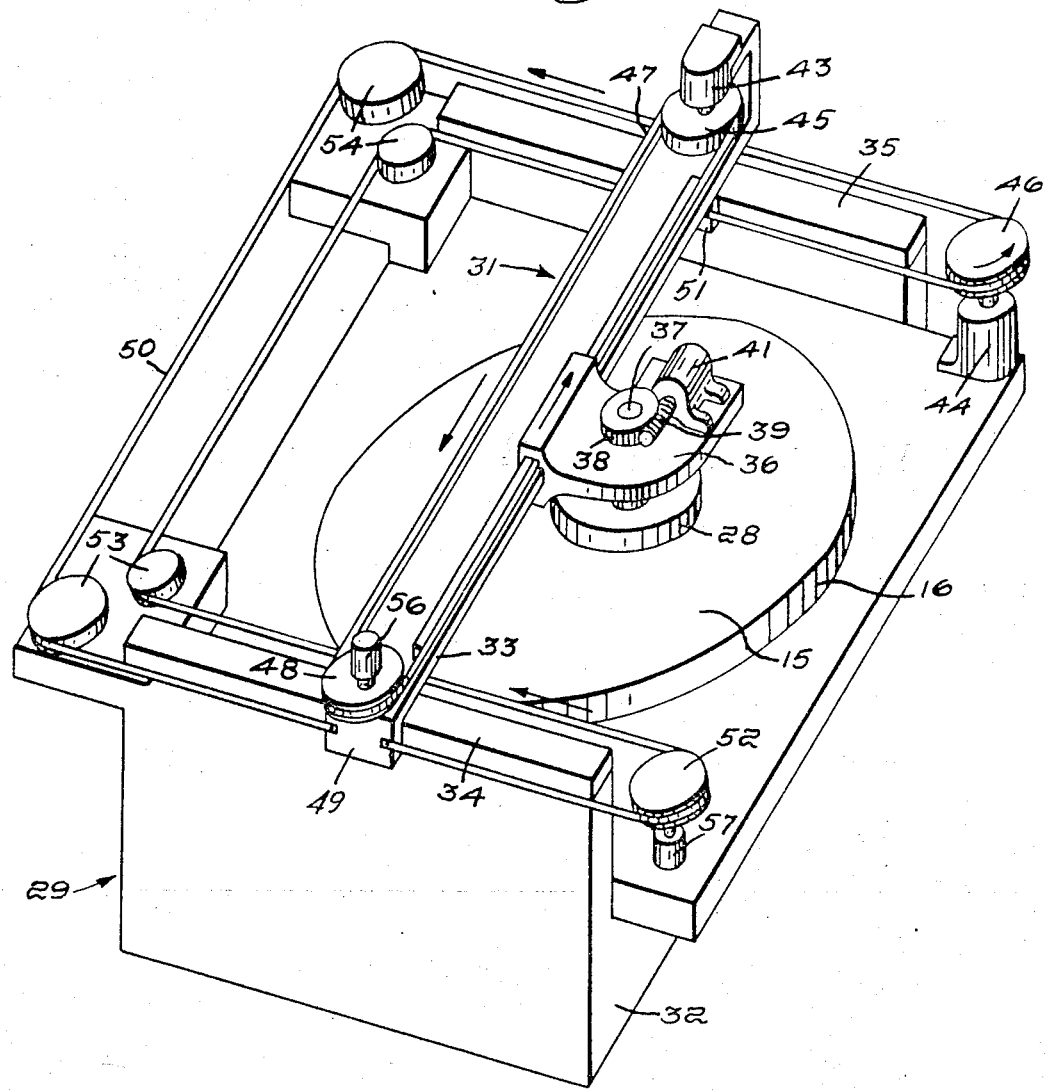
FIG. 2 is a perspective view of a device for generating optical surfaces in accordance with the invention.

FIG. 2 shows in greater detail the table 29 comprising the carriage 31 mounted on the base 32. The carriage 31 includes the movable guide 33 supported between the stationary guides 34 and 35 and adapted for movement therealong. Also included in the carriage 31 is the plate 36 that supports the lap 28 on a shaft 37 and is adapted for longitudinal movement on the movable guide 33. Keyed to the shaft 37 is the spur gear 38 that is engaged with the worm gear 39. The drive motor 41 actuates the gears 38 and 39 to produce rotation of the lap 28.

Mounted on the base 32 are the y-drive stepping motor 43, the x-drive stepping motor 44 and their associated drive wheels 45 and 46. The belt 47 has ends connected to opposite edges of the plate 36 and extends around the drive wheel 45 and belt return wheel 48. A second belt 50 extends between the drive wheel 46 and the belt return wheel 52 and is attached to the outer edge 49 and internal shoulder 51 of the guide 33. Alignment of the belt 50 is provided by the corner mounted positioning wheels 53 and 54. The position sensors 56 and 57 are coupled for rotation, respectively, with the return wheels 48 and 52.

Dependent upon the polarity of the voltages applied by the controller 23 to the motors 43 and 44 on lines 26 and 27, respectively, the lap 28 is moved in either the x-direction defined by the guides 34 and 35 or the y-direction defined by the guide 33 or in both directions simultaneously. For example, clockwise rotation of the x-drive motor 44 and associated drive wheel 46 produces movement of the guide 33 and attached lap 28 in the x-direction from right to left while counterclockwise rotation of the motor 44 and wheel 46 produces movement of the lap 28 in the opposite direction. Similarly, clockwise rotation of the y-drive motor 43 and associated drive wheel 45 produces movement of the plate 36 and attached lap 28 in one y-direction while counterclockwise rotation produces lap movement in the opposite direction. Thus, responsive to the digital information lines 21 and 22 the controller provides on lines 26 and 27 control voltages that produce movement of the lap toward a particular position on the surface 15 selected by the computer 19. After reaching the designated location, the position sensors 56 and 57 produce signals on lines 24 and 25 that eliminate control voltages on lines 26 and 27 until the next command is received from the computer 19.

FIG. 3 schematically illustrates the work surface 15 figuratively divided into an array 61 formed by the 25 adjoining square surface areas 62 of uniform size. Each of the surface areas 62 retains a numeral designating, for a specific example, that particular area's contour error. These numbers represent, in effect, the relative number of blank material decrements of a uniform predetermined size that must occur in each surface area 62 to convert the initial surface 15 into the optical surface desired. The relative contour errors are included intrinsically in the interference picture 18 information which is converted by the computer 19 into the form illustrated in FIG. 3. The computer 19 also references the various surface areas 62 according to their relative positions in a Cartesian coordinate type system. Therefore, the individual squares 62 can be identified by appropriate $x$ and $y$ values from 1 to 5 as indicated in FIG. 3.

Thus, for example, the $(x = 5, y = 5)$ area (upper right hand corner of the array 61) possesses a contour error of one while the $(x = 1, y = 5)$ area (upper left hand corner of the array 61) possesses a contour error of ten. This means that nine more material decrements of the predetermined size must occur in the $(x = 1, y = 5)$ area than in the $(x = 5, y = 5)$ area to produce in these areas the desired relative surface elevations. Similarly, there should occur two more material decrements in the $(x = 5, y = 1)$ area than in the $(x = 5, y = 5)$ area and seven more decrements in the $(x = 1, y = 2)$ area than in the $(x = 4, y = 3)$ area.

Having computed the information illustrated in FIG. 3, the computer 19 is programmed to provide sequentially on lines 21 and 22 digital outputs representing individual surface areas 62 in terms of their $x$ and $y$ coordinate values. This digital information is converted by the controller 23 into appropriate $x$ and $y$ control voltages that produce sequential movement of the lap 28 to various areas of the work surface 15 coinciding with the designated figurative surface area 62. The particular sequence in which the surface areas 62 are selected by the computer 19 and, accordingly, the form of the path followed by the lap 28 is an important feature of the invention as described below.

To produce the desired surface contour on the blank surface 15, the blank material volumes of various size must be removed from the surface areas 62 as indicated by the non-uniform values of their contour error numbers. However, the grinding and polishing techniques required to produce high quality optical surfaces prevent continuous operation by a lap on each surface area 62 until the appropriate amount of blank material has been removed. These techniques require, for example, that the lap continuously move along the blank surface 15 so as not to operate on any distinct surface portion for an extended period of time. Also, the path followed by the lap 28 along the work surface 15 should include no direct reversals in the direction of lap movement and as few abrupt changes in direction as possible. Such factors tend to produce local surface irregularities that reduce the quality of the finished optical surface.

Therefore, in a preferred method, the lap 28 having a working surface area substantially equal in size to that of the individual areas 62 is continuously moved along the surface 15 and through the individual areas 62. Movement of the lap 28 is controlled such that with each traversal through a particular surface area 62 a uniform predetermined volume of blank material is decremented. For example, in the illustration of FIG. 3, one of the uniform material volume decrements is represented by each digit in the contour error numbers assigned to the surface areas 62. Thus, generation of the desired optical surface requires that the moving lap 28 pass through the $(x = 1, y = 5)$ area 10 more times than it passes through the $(x = 4, y = 3)$ area; seven more times than it passes through the $(x = 5, y = 1)$ area; etc.

According to the invention, the individual areas 62 are decremented in required proportion and good optical techniques observed by controlling sequential movement of the lap center between the centers of the areas 62 according to the following rules: (1) After moving into one surface area, the lap next moves only to an adjacent surface area having a center either directly aligned with the previous move or at angle of 45° therewith. This limitation on direction of movement prevents lengthy lap operation in a small group of high error areas. (2) The lap moves to that surface area available within the imposed directional limitations still exhibiting the greatest contour error. This introduces a preference for high error areas and tends to reduce the maximum error range on the surface. (3) If two or more of the available adjacent surface areas have equally high surface contour errors, a random selection is made to determine the direction of lap movement. (4) To prevent trapping of the lap, the above limitations on directions of movement are altered when the lap occupies a surface area on the perimeter of the array 61. In this case, movement is permitted into any adjacent surface area other than that area occupied by the lap immediately before movement into its present position.

FIG. 4 schematically illustrates lap control according to the above method with the solid line 63 representing the path of lap movement over the surface 15 and the arrows representing the possible directions of lap movement out of each occupied area 62. As indicated, the lap begins in the ($x=3, y=1$) area and has available for an initial move the straight ahead ($x=3, y=2$) area, and the ($x=2, y=2$) and ($x=4, y=2$) areas at 45°. Of these, the ($x=4, y=2$) area has the highest contour error designation of seven and is selected for the initial move. The areas available for the next lap move include the straight ahead ($x=5, y=3$) area and the ($x=4, y=3$) and ($x=5, y=2$) areas at 45°. Of these, the ($x=5, y=2$) and ($x=5, y=3$) have equal contour errors designations of one which is greater than zero value of the ($x=4, y=3$) area. Accordingly, a random selection is made between two higher error surfaces and the lap moves into the ($x=5, y=3$) area. Since this area lies on the perimeter of the array 61, the 45° limitation on lap movement is eliminated making available all adjacent surface areas other than the ($x=4, y=2$) area previously occupied. Of these, the ($x=5, y=4$) has the highest contour error designation of 10 and is accommodated by the next lap movement. Again the occupied area lies upon the perimeter of the array 61 so that all adjacent surface areas are available with the exception of the previously occupied ($x=5, y=3$) area. Therefore, the lap next moves into the ($x=4, y=4$) area bearing the highest contour error designation of seven. As this area does not lie on the perimeter of the array 61, the adjacent surface areas available for the next move are again limited to the straight ahead ($x=3, y=4$) area and the ($x=3, y=5$) and ($x=3, y=3$) areas located at 45°. The above noted rules of movement continue to be applied as the lap moves sequentially through the ($x=3, y=5$); ($x=2, y=5$); ($x=1, y=5$); ($x=2, y=4$); ($x=2, y=3$); ($x=1, y=2$); ($x=1, y=1$) and ($x=2, y=1$) surface areas.

FIG. 5 shows a continuation of the lap travel path initiated in FIG. 4. It will be noted that the contour error designations associated with the individual areas 62 traversed along the path 63 of FIG. 4 have been reduced by one digit. The reductions correspond to the blank material decrements made by movement of the lap through these areas. Thus, of the adjacent areas available for move from the ($x=2, y=1$) area, both the ($x=1, y=2$) and the ($x=3, y=2$) areas have error designations of six with the contour error of the ($x=1, y=2$) area having been reduced from seven to six because of the material decrement produced during the lap travel indicated in FIG. 4. Again, a random selection is made and the lap moves into the ($x=3, y=2$) area. From there the lap proceeds in accordance with the above described rules of movement and sequentially passes through the ($x=4, y=2$); ($x=5, y=1$); and ($x=4, y=1$) areas.

Thus, the lap 28 generally progresses from a given area into an adjacent area that was not occupied by the lap immediately before movement into the given area and that still requires the greatest relative number of material decrements as indicated by its contour error designation number. The only exceptions being those occasions wherein such a move is prevented by application of Rule (1) above. An example of such an exception is the move shown in FIG. 4 from the ($x=4, y=2$) area to the ($x=5, y=3$) area rather than to any of the adjacent ($x=3, y=2$); ($x=3, y=3$); ($x=4, y=1$) and ($x=5, y=1$) areas, all bearing higher error designations. Because of the deliberately induced preference for movement into areas of highest contour error designations, the maximum range in values of all the error designating numerals is gradually reduced. It will be obvious from the descriptions above that this maximum range is theoretically proportional to the maximum relative elevational error existing between individual areas in the array and that the exact surface contour desired would be represented by identical error designation numerals in all of the areas 62.

The reduction in error designation range is indicated by FIG. 6 which illustrates the array 61 and the surface areas 62 with contour error designations after an extended period of lap travel in the manner described above. The various error designation numbers are now minus which merely indicates that the lap 28 has passed through each area a number of times greater than the area's original contour error number indicated in FIG. 3. Thus, for example, the ($x=1, y=1$) area has been traversed by the lap on seven separate occasions, the ($x=1, y=5$) area on eleven separate occasions, the ($x=4, y=3$) area on two separate occasions, etc. Since the relative values of the error designation numbers rather than their individual magnitudes are significant, the changes in sign are immaterial. Of importance however, is the fact that after extended travel of the lap the maximum range in error designation number values is three. This maximum range exists between the ($x=5, y=4$) area and each of the ($x=2, y=3$); ($x=3, y=3$) and ($x=4, y=5$) areas and is a substantial reduction from the original range of 10 existing between the ($x=4, y=3$) area and both the ($x=1, y=5$) and the ($x=5, y=4$) areas. The reduction indicates, of course, a proportional reduction in the degree of surface contour error originally existing on the surface 15. Thus, the method described permits systematic generations of a desired surface contour while also conforming to optical finishing techniques required for high quality surfaces.

It should be understood that the surface generation method schematically illustrated in FIGS. 3–6 is merely exemplary and that various modifications can be made in actual practice. For example, the actual number of individual surface areas in an array can vary substantially depending on the size and condition of the blank being finished. Suitable arrays for some types of optical surfaces can contain hundreds of individual surface areas. Also, the total length of the lap travel path in terms of total traversals through the individual surface areas generally will be much longer than that indicated by FIGS. 3 and 6. For this reason, periodic or continuous modification of the anticipated decrement size can be desirable to compensate for slow changes of lap characteristics. Such compensation can be based on previously observed rates of lap surface change. To additionally allow for intangibles, a complete surface finishing program can involve a number of sequential routines between each of which the work surface is measured and the information used to determine the succeeding routine.

As noted above, the limitations on lap movement defined in Rules (1) and (4) tend to reduce excessive periods of operation in a given area of the blank. Nevertheless, under some conditions the constant selection from the generally available three surface areas of the highest contour error designation can result in relatively long work periods in high contour error area groups and isolation of low contour error area groups. Such an occurrence can produce significant and undesirable changes in lap characteristics. To control this possible lap dispersion, somewhat modified finishing processes can be used in which an available surface area other than that having the highest contour error designation is selected for the next movement. For example, the three areas available for movement in the above described program can be identified according to their individual contour error designations as high, medium and low. The selection of a surface area for a new lap movement then can be made according to some predetermined probability. For example, the lap can be moved to the available high surface area 85 percent of the time, to the medium area 10 percent of the time and to the low area 5 percent of the time. In this way a greater dispersement of lap movement is obtained while still maintaining a relative preference for areas of highest contour error.

The above described method including the limitations on direction of lap travel defined in Rules (1) and (4) is highly desirable for generating high quality optical surfaces. However, for some applications one or more of the lap movement limitations can be eliminated. For example, the lap can move always to the adjacent area of highest contour error designation regardless of which area was previously occupied. In this case direct reversals in direction of lap travel will occur. Similarly, the limitations on lap movement direction changes of greater than 45° can be obviated. Obviously, methods of this type also will systematically reduce existing surface contour error. The only requirement for contour error reduction is that the lap travel path exhibit a preference for movement into areas of high contour error designation. Thus, additional such methods can be useful for other applications, especially those requiring less than high quality optical finishes.

FIG. 7 illustrates another preferred type of array 71 composed of adjacent uniformly sized, hexagonal surfaces areas 72. The method of surface generation utilizing the array 71 is similar to that described above except that the lap moves to areas having centers both aligned with the previous move and at angles of 60° therewith rather than at angles of 45° as in the above example. The solid line 73 represents the path of lap travel through the areas 72 and the arrows indicate the permissible directions of move out of each occupied area.

In addition to facilitating contour error reduction as described above, the hexagonal array 71 has the advantage of fitting more closely within the circular boundary usually provided by the typical optical work surface. Therefore, the lap can reach more easily all points on the perimeter of the work surface. Also, since the centers of all adjacent areas 72 in the hexagonal array 71 are spaced equal distances apart, the difficulty of correlation with real surface perimeters because of the difference in length between straight ahead and diagonal moves is eliminated.

Obviously, many modifications and variations of the present invention are possible in light of the above teachings. It is, therefore, to be understood that within the scope of the appended claims the invention can be practiced otherwise than as specifically described.

I claim:
1. Optical surface generating apparatus comprising:
   a. first support means for an optical blank having a work surface thereon;
   b. an optical lap having a lapping surface for operating upon the work surface of said optical blank;
   c. second support means for supporting the lapping surface of said optical lap adjacent the work surface of said optical blank;
   d. drive means for producing relative transverse movement between said lap and said blank in two independently controlled orthogonally related directions, said drive means including stepping motor means for moving said lap and said blank relative to each other in discrete steps in each of said two orthogonally related directions; and
   e. control means coupled to said drive means for independently controlling the relative movement between said lap and said blank in each of said two orthogonally related directions.

2. Optical surface generating apparatus as recited in claim 1 wherein the area of said lapping surface is less than the area of said work surface.

3. Optical surface generating apparatus as recited in claim 1 wherein said control means includes means for moving said lap relative to said blank in a predetermined path.

4. Optical surface generating apparatus as recited in claim 2 wherein said control means includes sensor means for sensing the transverse position of said lap relative to the work surface of said blank in each of said two orthogonally related directions.

5. Optical surface generating apparatus as recited in claim 1 and further including means for rotating said lap relative to said blank for generating a desired contour on said work surface.

6. Optical surface generating apparatus as recited in claim 1 wherein said drive means includes means for producing relative movement between said lap and said blank in each of said two orthogonally related directions simultaneously.

7. Optical surface generating apparatus as recited in claim 2 wherein the area of said lapping surface is less than one-half the area of said work surface.

* * * * *